United States Patent
Nicolas

(10) Patent No.: US 12,143,562 B2
(45) Date of Patent: Nov. 12, 2024

(54) CALIBRATION OF AN IMAGING IWR DIGITAL PIXEL

(71) Applicant: COMMISSARIAT A L'ENERGIE ATOMIQUE ET AUX ENERGIES ALTERNATIVE, Paris (FR)

(72) Inventor: Jean-Alain Nicolas, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 108 days.

(21) Appl. No.: 18/158,681

(22) Filed: Jan. 24, 2023

(65) Prior Publication Data

US 2023/0239459 A1    Jul. 27, 2023

(30) Foreign Application Priority Data

Jan. 25, 2022 (FR) .................... 22 00606

(51) Int. Cl.
    *H04N 17/00* (2006.01)
    *H04N 25/67* (2023.01)
    *H04N 25/771* (2023.01)
    *H04N 25/78* (2023.01)

(52) U.S. Cl.
    CPC ......... *H04N 17/002* (2013.01); *H04N 25/771* (2023.01); *H04N 25/78* (2023.01); *H04N 25/67* (2023.01)

(58) Field of Classification Search
    CPC .... H04N 17/002; H04N 25/771; H04N 25/78; H04N 25/67; H04N 25/671; H04N 25/772
    USPC ....................................... 348/294
    See application file for complete search history.

(56) References Cited

U.S. PATENT DOCUMENTS

| | | | |
|---|---|---|---|
| 2010/0309591 A1* | 12/2010 | Shea ............... | G01R 19/0092 361/42 |
| 2011/0303846 A1 | 12/2011 | Thorne | |
| 2013/0149464 A1* | 6/2013 | Rokuhara ............ | H05K 3/02 427/79 |
| 2014/0008521 A1 | 1/2014 | Rostaing et al. | |
| 2016/0261811 A1 | 9/2016 | Dent et al. | |
| 2021/0136306 A1 | 5/2021 | Nicolas | |

OTHER PUBLICATIONS

French Preliminary Search Report Issued Oct. 13, 2022 in French Application 22 00606 filed on Jan. 25, 2022 (with English Translation of Categories of Cited Documents), 2 pages.

* cited by examiner

*Primary Examiner* — Usman A Khan
(74) *Attorney, Agent, or Firm* — Oblon, McClelland, Maier & Neustadt, L.L.P.

(57) ABSTRACT

An imaging pixel formed by a photodetector connected to a reading circuit comprising:
- an integration capacitance,
- a transistor for resetting the integration capacitance,
- a coupling transistor between the photodetector and the integration capacitance,
- a memorisation capacitance,
- a second transistor for resetting the memorisation capacitance,
- a memorisation switch between the integration capacitance and the memorisation capacitance, to enable different configurations corresponding to different phases of assessing parameters of the pixel and in particular a ratio R=Cint/Cmem.

12 Claims, 9 Drawing Sheets

CALIBRATION OF AN IMAGING IWR DIGITAL PIXEL

TECHNICAL FIELD

The present invention relates to the field of imaging devices and in particular those provided with IWR-type ("Integrate While Read") pixels for which an integration phase and a phase of reading a previous integration could take place at the same time. More particularly, it relates to pixels provided with an architecture for charge packet counting and exploitation of the residual voltage on the integration capacitance and provides an improved device enabling a measurement of particular parameters of an IWR pixel in order to assess the dispersals with respect to the other pixels of the same imager and to be able to perform a calibration of a large portion of the fixed spatial noise present on the imager.

PRIOR ART

Typically, an imager or an image sensor is formed by an array of pixels, each pixel being provided with a photodetector, for example a photodiode or a phototransistor, intended to convert an electromagnetic radiation into an electrical signal. The photodetector is associated to a reading circuit.

Some imagers are designed to detect a particular range of wavelengths and operate for example in the infrared. Regardless of the wavelength range for which an imager is designed, it is intended to faithfully render, over its entire surface, a digital image in the widest possible operating range from the lowest to the highest intensities that it should be able to measure. The purpose is to be able to convert and measure the captured electromagnetic radiation with the highest possible resolution.

A principle for reading the measurement consists in integrating, over a predefined time period called integration time Tint, a current Id derived from the photodetector by charging and discharging an integration capacitance which would have been charged or discharged beforehand at a predefined value.

Depending on the value of the current Id, which is proportional to the captured luminous energy, the integration capacitance is discharged more or less quickly.

However, it turns out to be difficult to be able to provide for an integration capacitance with a sufficient value to allow achieving a desirable operating range in terms of minimum and maximum measurable luminous energies.

A circuit whose block diagram is represented in FIG. 1 allows overcoming this difficulty. Since it is not possible to have a capacitance with a sufficient value in each pixel, the integration capacitance is charged or discharged several times, and the number of chargings or discharges varies according to the luminous energy captured by a diode 2, this number being typically as great as the discharge current Id is high.

In this circuit, a voltage Vc at the terminals of an integration capacitance Cpix is let to evolve between a fixed first reset voltage, in this example equal to a supply voltage VDD of the capacitance Cpix and a fixed second threshold voltage, in this example denoted Vref. When the voltage Vc at the terminals of the integration capacitance Cpix reaches the voltage Vref, a comparator circuit 30 detects that and a pulse generator stage 35 automatically generates a reset pulse 32 in the form of a charge injection $Q_0$ which, through a switch 20, causes charging of the integration capacitance Cpix. Thus, a loopback is formed.

When the switch 20 becomes conductive for the duration of a reset pulse, a quick charging of the integration capacitance Cpix is obtained. The charging and discharge cycles are automatically repeated throughout the entire duration of integration Tint through the above-described loopback. The number of complete charging and discharge cycles is counted, in each pixel, by a counter 40.

Hence, this number provides a measurement of the amount of luminous energy captured by the photodiode 2 over the integration time Tint.

The value of the current Id, which is proportional to the captured luminous energy, depends on the number of complete charging (or discharge) cycles.

To increase the accuracy of the measurement, i.e. obtain the lowest possible discrepancy between two measurable signals, one could look to perform a measurement of a residual voltage $v_{residu}$ remaining at the terminals of the integration capacitance during the last charging or discharge interrupted by elapse of the integration time Tint.

Such a voltage is schematically illustrated in FIG. 2 in a particular case where the integration voltage varies between a reset voltage Vreset and a threshold voltage Vref, the threshold voltage Vref being this time higher than the reset voltage.

A number of chargings $Q_0$ of the integration capacitance Cint over the integration time Tint is counted and the quantisation resolution being $Q_0$, $Q_0$ should be low and therefore a number of bits should be high to obtain a suitable resolution and a low quantisation noise.

At the end of integration, a digital piece of information originating from the counter of each pixel as well as the information on the residual voltage at the column root digitised by an analog-to-digital converter 50 are obtained.

Nonetheless, the information of the counter 40 represents just a number of charge packets. Hence, the value of this charge packet $Q_0$ should be known. This result may be obtained thanks to the knowledge of Cpix, Vreset and Vref. One difficulty is that each pixel is subject to dispersals of parameters of the components that compose it, in particular the transistors of the comparator 30 which detects the passage of the voltage of the integration capacitance above the threshold voltage Vref. This results in that the voltage for triggering the reset could vary from one pixel to another. This voltage for the ith pixel of the array may be equal to Vref+Voffset(i). Similarly, the reset voltage Vreset could be not exactly the same for each pixel because of the different voltage drops in the connections distributing the reset voltage Vreset in the pixel array.

The document EP 2 687 020 B1 gives an architecture and a methodology to accurately measure such information Vseuil+Voffset(i) and Vreset(i). for each pixel.

In both of the aforementioned devices, the reading circuit allowing carrying out counting of charge packets and using the residual voltage, operates according to an ITR ("Integrate Then Read") mode, i.e. for which an integration phase and a reading phase take place successively.

Yet, for some applications, one could wish to maximise the integration time in order to capture as much as possible of the signal (photons) while limiting the time during which a scenery is not observed. For this purpose, there are pixels whose reading circuit operates according to a so-called "IWR" ("Integrate While Read") mode for which the integration phase and the reading phase take place at the same place.

In comparison with ITR pixels, IWR pixels further typically include an additional so-called "memorisation" capacitance.

The calibration implemented in the aforementioned document EP 2 687 020 B1 is effective in the context of a pixel operating in the ITR mode but might turn out to be not enough in the case of an IWR pixel.

DISCLOSURE OF THE INVENTION

According to one aspect, the present invention relates to an imaging device including a plurality of pixels, each pixel being formed by a photodetector associated and connected to a reading circuit, comprising:
- an integration capacitance, connected to a first node and intended to store charges originating from the photodetector,
- a first reset transistor configured, when it is made conducting, to reset the integration capacitance,
- at least one so-called "coupling" transistor, arranged between the photodetector and the integration capacitance and able to, alternately, couple the photodetector to the first node when it is made conducting, and decouple the photodetector off the first node when it is made non-conducting,
- a memorisation capacitance connected to a second node,
- a second reset transistor configured, when it is made conducting, to reset the memorisation capacitance,
- a so-called "memorisation" switch between the integration capacitance and the memorisation capacitance, when it is made conducting, to connect the integration capacitance and the memorisation capacitance, and when it is made non-conducting, to disconnect the integration capacitance from the memorisation capacitance.

Thus, with the introduction of a memorisation switch and with a coupling transistor, an IWR-type pixel is implemented which allows adopting different configurations depending on whether we are in a normal operation mode or in an operating mode in which one or more measurement(s) is/are carried out to perform a calibration.

Advantageously, the device further comprises: a circuit for controlling the reading circuit configured, during a measurement cycle including a phase of estimating a ratio R=Cint/Cmem between a value of the integration capacitance and a value of the memorisation capacitance:
- according to a first part of said phase of estimating said ratio R to make the first reset transistor and the second reset transistor conducting so as to respectively reset the integration capacitance and the memorisation capacitance and to make said memorisation switch non-conducting so as to disconnect the integration capacitance from the memorisation capacitance and during the first phase and during the first part, to decouple the photodetector off said first node, then,
- according to a second part of said estimation phase to make the first reset transistor and the second reset transistor non-conducting and to make said memorisation switch conducting so as to connect the first node and the second node, and thus be able to assess a potential at said second node representative of said ratio R=Cint/Cmem.

When assessing this ratio R, a compression effect that occurs when connecting the integration and memorisation capacitances is taking into account. This compression depends on the ratio Cint/Cmem, Cint represents a value of the integration capacitance but also all parasitic capacitances that add on this node, in particular the input capacitance of the compressor. Similarly, Cmem represents the value of the memorisation capacitance as well as the parasitic capacitances that add at this node. Hence, dispersals on these values from one pixel to another result in a difference on this capacitance ratio from one pixel to another. By assessing this ratio R, correction data are added allowing carrying out an improved calibration of each pixel.

Advantageously, the reading circuit further includes:
- a comparator connected to the integration capacitance, a first input of the comparator being coupled to the first node, a second input of the comparator being set at a reference voltage,
- a pulse generator block at the output of the comparator and configured, when it is coupled to the first reset transistor and when the first input reaches the reference voltage, to consecutively emit a pulse for triggering a reset of the integration capacitance via the first reset transistor.

The reading circuit may also comprise:
- a pulse counter at the output of the pulse generator
- a element for memorising counting digital data derived from said pulse counter.

According to a possible implementation, the control circuit may be configured to produce an operating mode control signal so as, during said phase of estimating said ratio,
during said first part: to set said operating mode control signal in a first state so as to set the pulse generator block in a first operating mode in which the pulse generator block holds at the output, irrespective of the first input, a signal for triggering a reset of the integration capacitance, then
during the second part: to set said control signal in a second state so as to set the pulse generator block in a second mode corresponding to said normal operation mode.

According to an advantageous embodiment, the device may further comprise a switching circuit provided with at least one first switch arranged between the output of the comparator and the first reset transistor and a second switch arranged between the output of the pulse generator.

The first reset transistor and the second reset transistor may be controlled by the control circuit and intended to, respectively, directly connect the output of the comparator to the reset transistor during at least one phase of the reference voltage assessment measurement cycle, and to connect the output of the pulse generator to the first reset transistor during at least one other phase of the measurement cycle or of a so-called "normal operation" cycle.

The control circuit of the reading circuit may be further configured, during the phase of assessing the reference voltage Vref at the input of the comparator, to:
make the first switch conducting while making the second switch non-conducting, while connecting the first node to the second node, so as to be able to assess a value of the reference voltage according to a potential at said second node.

According to a possible implementation for which the reset of the memorisation capacitance is done at a first reset voltage and the control circuit may be configured, during a phase of assessing said first reset voltage of said measurement cycle, to reset the integration capacitance while making said memorisation switch conducting so as to connect the integration capacitance to the memorisation capacitance.

According to a possible implementation for which the reset of the memorisation capacitance is done at a second reset voltage, the control circuit may be configured, during a phase of assessing said second reset voltage of said measurement cycle: to reset the memorisation capacitance while making said memorisation switch non-conducting so as to disconnect the integration capacitance from the memorisation capacitance.

Advantageously, the coupling transistor may be arranged in series with a biasing stage of the photodetector, in particular a direct-injection (DI) or buffered direct-injection (BDI) biasing stage.

The coupling transistor typically includes an electrode amongst its source or drain electrodes connected to an electrode of the photodetector and another electrode amongst its drain or source electrodes connected to the integration capacitance, the control circuit of the reading circuit being configured, during the first step of said phase of assessing said ratio R, to apply to the gate of the coupling transistor, a signal for triggering decoupling of the photodetector off said first node.

According to a particular embodiment, the coupling transistor may be a direct-injection (DI) biasing transistor of the photodetector.

Advantageously, the reading circuit may be further provided with a follower transistor coupled to the second node and with a line selection transistor.

According to a possible implementation, the first reset transistor includes an electrode set at a first reset voltage whereas the second reset transistor includes an electrode set at a second reset voltage distinct from the first reset voltage.

This allows better adapting the voltage range of the output dynamics, it is possible to provide for a different reset voltage for the memorisation capacitance.

BRIEF DESCRIPTION OF THE DRAWINGS

The present invention will be better understood in light of the following description and the appended drawings wherein.

Identical, similar or equivalent portions of various figures bear the same numerical references such as to facilitate the change from one figure to the other.

The various portions shown in the figures are not necessarily according to a uniform scale, in order to make the figures more readable.

DETAILED DISCLOSURE OF PARTICULAR EMBODIMENTS

Figure 1:
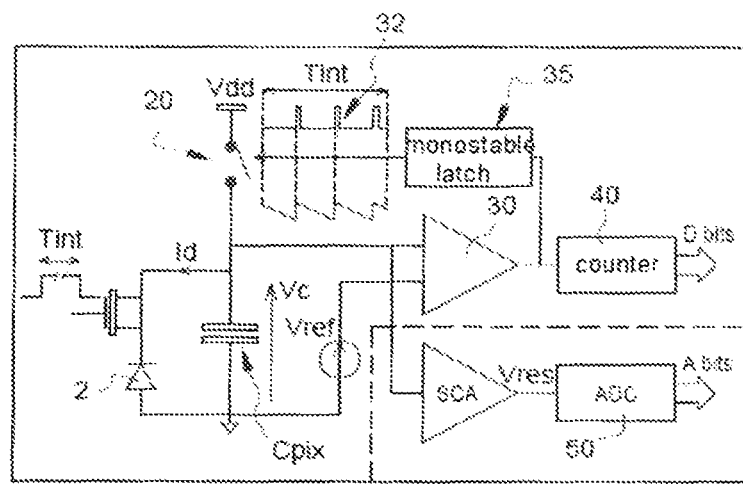
FIG. 1 is intended to illustrate a reading circuit of an imaging pixel according to the prior art and of the ITR® type.
Figure 2:
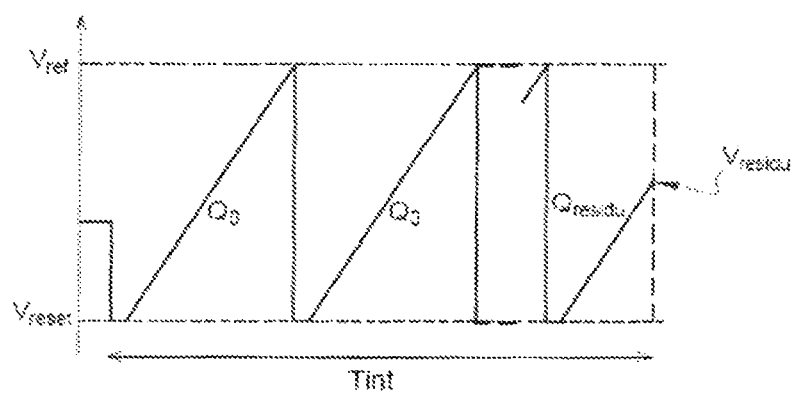
FIG. 2 is intended to illustrate the evolution of a voltage at the terminals of an integration capacitance over an integration time and a residual voltage that one wishes to be able to determine at the end of this integration time.
Figure 3:
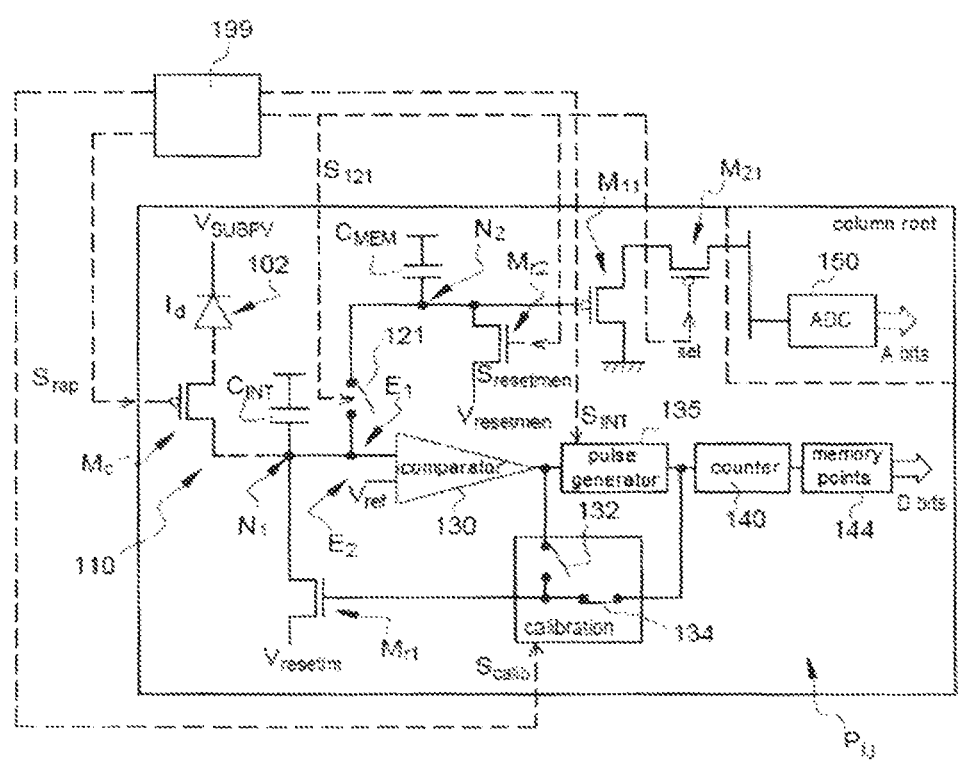
FIG. 3 is intended to illustrate an embodiment of a circuit for reading an IWR-type imaging pixel and as implemented according to the invention.

An example of a structure of an imaging reading circuit 110 as implemented according to an embodiment of the present invention is given in FIG. 3.

The reading circuit 110 is connected to a photodetector, for example a photodiode 102, which transforms an electromagnetic radiation into an electric current Id. The associated photodiode 102 and reading circuit 110 form a detection element also called "pixel". The imager typically include a plurality of pixels P(i,j) which may also be arranged as an array of l row(s) and j column(s), (i,j being integers equal to or greater than 1).

According to a particular embodiment, the photodiode 102 may be intended to operate in the infrared domain, the photodiode 102 then being typically reverse-polarised and delivering to the reading circuit 110 a current Id representative of an observed scenery. The reading circuit 110 herein has an IWR-type (standing for "Integrate While Read") structure which, because of the presence of a memorisation stage, enables it to perform an integration while a readout of a value of a signal resulting from a previous integration is performed.

Thus, besides an integration capacitance $C_{INT}$, connected to a first node $N_1$, the reading circuit 110 is provided with a memorisation capacitance $C_{MEM}$ connected to a second node $N_2$.

The reading circuit 110 is herein particular in that it is also provided with a so-called "memorisation" switch 121 between the first node $N_1$ and the second node $N_2$.

This switch 121 typically formed by one or more transistor(s) is configured, when it is made conducting (i.e. closed), to connect the integration capacitance $C_{INT}$ and the memorisation capacitance $C_{MEM}$, and when it is made non-conducting (i.e. open), to disconnect the integration capacitance $C_{INT}$ from the memorisation capacitance $C_{MEM}$. Thus, such a switch 121 enables the reading circuit 110 to adopt different configurations in particular depending on the different phases of a measurement cycle that the reading circuit 110 is likely to adopt in order to be able to perform a calibration of the pixel. The memorisation switch 121 allows alternately isolating from one another or connecting together a portion of the reading circuit 110 coupled to the first node $N_1$ and to the integration capacitance $C_{INT}$ and another portion of the reading circuit coupled to the second node $N_2$ and to the memorisation capacitance $C_{MEM}$.

In this structure where it is possible to connect the integration capacitance $C_{INT}$ and the memorisation capacitance $C_{MEM}$ via the switch 121 in order to memorise a residual voltage, a compression effect that might occur when connecting the two capacitances $C_{INT}$ and $C_{MEM}$ should be taken into account. This compression depends on a ratio R=Cint/Cmem which may be specific to each pixel and which should be assessed herein, Cint representing a value of the integration capacitance, while considering the parasitic capacitances which add on the first node $N_1$, in particular an input capacitance of a comparator 130. Similarly, Cmem represents a value of the memorisation capacitance, while considering the parasitic capacitances which add on the second node $N_2$. Hence, dispersals on these values from one pixel to another result in a difference from one pixel to another on this ratio R which is to be assessed.

A measurement of this ratio R should be carried without introducing a lot of additional components and in particular a lot of additional transistors in the pixel.

A particular assessment phase of a measurement cycle is implemented to assess this ratio R.

According to a first part of this phase of assessing the ratio R, we begin by resetting each capacitance $C_{INT}$, $C_{MEM}$ independently, at their respective reset voltages Vresetmem, VresetInt. Advantageously, these reset voltages Vresetmem, VresetInt may be different from each other. In particular, different respective reset voltages Vresetmem, VresetInt may allow extending the detection dynamics.

The reset of the integration capacitance $C_{INT}$ is implemented by means of a first reset transistor $Mr_1$ coupled to the first node $N_1$.

When it is made conducting, the first reset transistor $Mr_1$ allows applying a first reset voltage VresetInt to the integration capacitance $C_{INT}$. The reset of the memorisation capacitance $C_{MEM}$ is implemented by means of a second reset transistor $Mr_2$ coupled to the node $N_2$. When it is made conducting, the second reset transistor $Mr_2$ allows applying a second reset voltage Vresetmem to the memorisation capacitance $C_{MEM}$.

Then, according to a second part of this phase of assessing the reset R, the reset is stopped by deactivating, in other words by blocking or making non-conducting, the reset transistors $Mr_1$ and $Mr_2$ and by connecting the capacitances $C_{INT}$, $C_{MEM}$ together via the memorisation switch 121 made conducting.

Prior to this second phase part, the photodiode current 102 is cut off via a coupling transistor Mc arranged between the integration capacitance $C_{INT}$ and the photodetector. To allow carrying out the phase of assessing the ratio R, a circuit 199 for controlling the reading circuit 110 is provided for and allows applying different control signals. The control circuit 199 is typically a circuit external to the pixel and to the array and in particular provided with a logic block. The control circuit 199 may also be implemented by a microprocessor or by a programmable logical circuit (FPGA).

Figure 4:
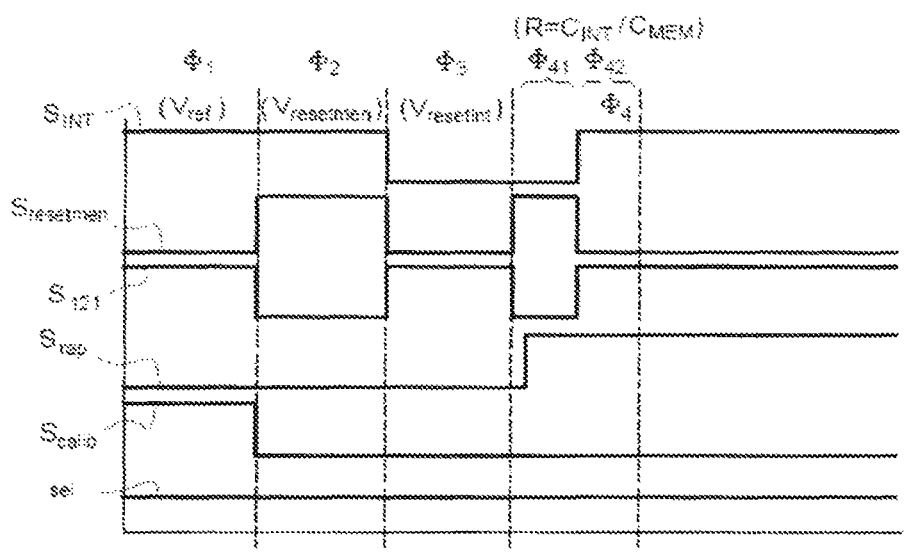
FIG. 4 is intended to illustrate an example of a sequence of control signals of different elements of the reading circuit and which may be performed during different assessment phases implemented during a measurement cycle performed on the IWR imaging pixel as implemented according to the invention.

An example of a time chart of the evolution of control signals is given in FIG. 4. The phase of assessing the ratio R is herein referenced Φ4 in this figure and belongs to a measurement cycle during which different parameters may be assessed. In this FIG. 4, the signals Sresetmem, Srap, are signals applied respectively on the gate of the second reset transistor $Mr_2$, on the gate of the coupling transistor Mc, and allowing making them alternately conducting or non-conducting, whereas the signal $S_{121}$ is a control signal of the switch 121. Thus, the open or closed (i.e. respectively non-conducting or conducting) state of the memorisation switch 121 can be controlled by means of the signal $S_{121}$ derived from the control circuit 199.

The signal $S_{INT}$ is a control signal applied on a pulse generator block 135 and which, depending on its state, allows setting a pulse generator block 135 alternately in a first operating mode or in a second operating mode.

By applying the signal $S_{INT}$ at this location of the device, it is advantageously possible to use the same reset transistor Mr1 to discharge the integration capacitance $C_{INT}$ each time the threshold voltage Vref is overpassed, but also to keep the first node $N_1$ at a voltage VresetInt when operating off an integration phase.

When no integration is performed, the signal $S_{INT}$ may be set in a first state, for example such that $S_{INT}=0$, so as to force the pulse generator block 135 in a first operating mode in which it continuously outputs a reset signal on the gate of the reset transistor Mr1 and allows making the latter conducting, and that being so irrespective of the value on its input E1.

During an integration phase, the signal $S_{INT}$ is typically set in a different state, for example such that $S_{INT}=1$, for which the pulse generator block 135 operates in a second so-called "normal" mode during which, this time, it generates a reset pulse only each time the threshold is overpassed, in other words when at its input a signal indicates that the voltage Vref is overpassed.

Thus, the control circuit 199 is configured, according to a first part (first part $\Phi_{41}$ of the phase $\Phi_4$ in FIG. 4) of the phase of assessing the ratio R, to make the first reset transistor Mr1 and the second reset transistor Mr2 conducting in order to respectively reset the integration capacitance $C_{INT}$ by applying the reset voltage VresetInt thereto and reset the memorisation capacitance $C_{MEM}$ by applying the reset voltage Vresetmem thereto and make said memorisation switch 121 non-conducting in order to disconnect the integration capacitance $C_{INT}$ from the memorisation capacitance $C_{MEM}$.

In the particular embodiment illustrated in FIGS. 3 and 4 where the reset transistor $Mr_2$ is of the NMOS type, a signal Sresetmem set in the high state (during the first part $\Phi_{41}$ of the phase $\Phi_4$) on its gate allows resetting the memorisation capacitance $C_{MEM}$. In the particular embodiment illustrated in FIGS. 3 and 4 where the coupling transistor 121 is a NMOS-type transistor, a signal $S_{121}$ set in a low state (during the part $\Phi_{41}$ of the phase $\Phi_4$) on its gate allows isolating the integration capacitance $C_{INT}$ from the memorisation capacitance $C_{MEM}$.

During the first part (part $\Phi_{41}$ of the phase $\Phi_4$) of the phase of assessing the ratio R, the signal Srap applied on the gate of the decoupling transistor Mc is modified (setting in the high state in the part $\Phi_{41}$ in the particular embodiment where Mc is of the PMOS type) so as to decouple the photodetector 102 off the integration capacitance $C_{INT}$.

In turn, the signal $S_{INT}$ is typically set in a state so as to set the pulse generator block 135 in its above-described first operating mode.

According to a second part (part $\Phi_{42}$ of the phase $\Phi_4$) of this phase of assessing the ratio R in the measurement cycle, the control circuit 199 makes the first reset transistor Mr1 and the second reset transistor Mr2 non-conducting and the memorisation switch 121 conducting so as to connect the first node N1 and the second node N2. This is reflected by a change in the state of the signals $S_{INT}$, $S_{resetmem}$ and $S_{121}$ in the part $\Phi_{42}$ of the time chart of FIG. 4. The signal $S_{INT}$ is then set in a state so as to set the pulse generator block 135 in its second operating mode, in other words its above-described normal operating mode. Thus, during the phase of assessing $\Phi_4$ the ratio R, the block 135 is set alternately in its first operating mode then in its second operating mode.

The ratio R may be assessed by assessing the potential at the second node $N_2$.

Thus, it is possible to read a voltage Vf on this second node $N_2$ by means of a follower. Thus, in the illustrated example, the reading circuit 110 is further provided with a follower transistor $M_{11}$ coupled to the second node $N_2$ and with a line selection transistor $M_{21}$. The selection is herein performed by means of a signal sel applied on the gate of the selection transistor $M_{21}$. The voltage Vf may be read at the root of a column of pixels to which the pixel Pi,j whose ratio R is to be assessed is connected. The read voltage is typically converted into a piece of data digitised by means of an analog-to-digital converter 150 arranged at the root of the column.

This final voltage Vf, read throughout the follower meets the following equation:

$$V_f(C_{int}+C_{mem})=C_{mem}V_{resetMem}+C_{int}V_{resetInt},$$

with VresetInt and Vresetmem respectively corresponding to the first reset voltage and to the second reset voltage.

This equation may also be expressed as follows:

$$R = \frac{C_{int}}{C_{mem}} = \frac{V_{resetMem} - V_f}{V_f - V_{resetInt}}$$

Each pixel of the imager may have a ratio $$R = \frac{C_{int}}{C_{mem}}$$

that is specific thereto, this ratio $$R = \frac{C_{int}}{C_{mem}}$$

is advantageously assessed for each of the pixels of the imager.

Typically, the reading circuit 110 further includes a comparator 130 upstream of the pulse generator 135 and which is provided with a first input E1 coupled to the integration capacitance $C_{INT}$ and with a second input E2 set at a reference voltage Vref that one might also wish to measure or assess for each pixel of the array and in particular for a pixel Pi,j as illustrated in FIG. 3.

A pulse generator block 135 is provided for at the output of the comparator 130. This pulse generator block 135, for example provided with a monostable latch and with switch elements, is configured, in its second so-called "operating" operation mode when the first input E1 reaches the reference voltage Vref, to emit a pulse for triggering a reset of the integration capacitance $C_{INT}$ via the first reset transistor Mr1. When the reference voltage Vref is reached, the output of the comparator 130 toggles which causes the emission of a pulse at the output of the generator block 135 which is applied on the gate of the first reset transistor Mr1, which then imposes the reset voltage VresetInt on the integration capacitance $C_{INT}$ by a loopback on the first node $N_1$.

At the output of the pulse generator block 135, the reading circuit 110 herein typically includes an integrated pulse counter 140 and an element 144 for memorising counting digital data at the output of the pulse counter 140.

The reading circuit 110 is also provided with a switching circuit comprising a first switch 132 arranged between the output of the comparator 130 and the first reset transistor Mr1 as well as a second switch 134 arranged between the output of the pulse generator block 135 and the first reset transistor Mr1.

Depending on the state of a signal Scalib emitted by the control circuit 199, the first switch 132 is intended to alternately connect the output of the comparator 130 directly to the first reset transistor Mr1 or disconnect the output of said comparator 130 from the first reset transistor Mr1.

Depending on the state of a signal Scalib emitted by the control circuit 199, the second switch 134 is intended to alternately connect the output of the pulse generator block 135 to the first reset transistor Mr1 or disconnect the output of the pulse generator block 135 from the reset transistor Mr1.

Both of the first switch 132 and the second switch 134 are herein controlled by the signal Scalib.

During the phase $\Phi_1$ of the calibration, the signal Scalib is in a first logic state, for example such that Scalib=1, so as to position the first switch 132 in a conducting (i.e. closed) state and the second switch 134 in a non-conducting (i.e. open) state. The feedback is then carried out by the output of the comparator 130 which controls the first reset transistor Mr1. In this configuration, the first node N1 may be set at a voltage Vref+Voffset.

A change in the state of the signal Scalib, causes a change in the respective states of the two switches 132, 134. Thus, when the signal Scalib is in a second logic state, for example such that Scalib=0, the first switch 132 is set in a non-conducting (i.e. open) state and the second switch 134 in a conducting (i.e. closed) state. The feedback is then carried out by the output of the pulse generator block 135.

Thus, the switching circuit provided with the switches 132, 134 allows implementing different configurations. In particular, the output of the comparator 130 is directly connected to the reset transistor Mr1 during at least one phase of a measurement cycle whereas the output of the pulse generator block 135 is connected to the first reset transistor Mr1 during at least one other phase of the measurement cycle or of a so-called "normal operation" cycle.

Preferably, other information that the aforementioned ratio R are assessed as a complement to be able to carry out an effective calibration of the pixel Pi,j.

Thus, a measurement cycle implemented on the pixel Pi,j may also comprise a phase of assessing the value of the reference voltage Vref at the input E1 of the comparator 130. Such a phase of assessing the reference voltage Vref may be carried out prior to the phase of assessing the ratio R in a measurement cycle.

Thus, in the embodiment illustrated in FIG. 4, such a phase of assessing the reference voltage Vref at the input of the comparator 130 (portion $\Phi 1$ of the time chart of FIG. 4) corresponds to the first phase of a measurement cycle during which the ratio R is also assessed as described before.

During this assessment phase, the control circuit 199 makes the first switch 132 conducting while making the second switch 134 non-conducting, whereas the first node is connected to the second node via the switch 121 made conducting so as to be able to assess a value of the reference voltage Vref according to a potential at said second node. A measurement cycle implemented on the pixel Pi,j may also comprise a phase of assessing a value of the reset voltage Vresetmem of the memorisation capacitance $C_{MEM}$. Such a phase of assessing the second reset voltage Vresetmem may be carried out before the phase of assessing the ratio R in the measurement cycle.

In the embodiment illustrated in FIG. 4, such an assessment phase (portion Φ2 of the time chart of FIG. 4) is carried out after the phase of assessing the voltage Vref (corresponding to the portion Φ1) and before the phase of assessing the ratio R (portion Φ4) and corresponds in particular to the second phase of the measurement cycle.

To perform this phase, the control circuit 199 is configured to reset the memorisation capacitance $C_{MEM}$ while making said memorisation switch 121 non-conducting. Thus, the integration capacitance $C_{INT}$ is disconnected from the memorisation capacitance $C_{MEM}$. An assessment of the potential at the second node $N_2$ subsequent to this reset by means of the follower $M_{11}$ may then allow obtaining a measurement of the second reset voltage Vresetmem for the pixel Pi,j.

A measurement cycle implemented on the pixel Pi,j may also comprise a phase of assessing a value of the voltage of the reset voltage Vresetint of the integration capacitance $C_{INT}$.

Such a phase of assessing the first reset voltage Vresetint may be carried out before the phase of assessing the ratio R in a measurement cycle.

In the embodiment illustrated in FIG. 4, such a phase of resetting the integration capacitance $C_{INT}$ (portion Φ3 of the time chart) corresponds in particular to the third phase of the measurement cycle. To perform this phase, the control circuit 199 is configured to modify the signal $S_{INT}$ sent to the pulse generator block 135, so that this block 135 is set in its first operating mode. In this first operating mode, regardless of the value of its input, the block 135 continuously generates a reset signal on the gate of the reset transistor Mr1 and allows making the latter conducting to reset the integration capacitance $C_{INT}$. The control circuit 199 makes said memorisation switch 121 conducting via a signal $S_{121}$. Thus, the integration capacitance $C_{INT}$ and the memorisation capacitance $C_{MEM}$ are connected.

An assessment of the potential at the second node $N_2$ consecutive to this reset by means of the follower may then allow obtaining a measurement of the first reset voltage Vresetint for the pixel Pi,j.

Thanks to these values obtained for each pixel during a measurement cycle, it is possible to calculate the integrated signal for each pixel independently. As indicated before, an accurate readout of a current uses two values: that one of the counter 140 and a residual voltage.

These two values may be expressed in charges by means of the following expression:

$$Q_{compteur} = N_{compteur} * C_{int} * (V_{ref} - V_{resetInt})$$

And $$Q_{résidu} = (C_{mem} + C_{int}) * V_f - C_{mem} * V_{resetMem} - C_{int} * V_{resetInt}$$

With Vf being the residual voltage read at the end of the integration on the memorisation capacitance.

The measurement cycle enables us to obtain the values Vref, VresetInt, VresetMem and of the ratio R=Cint/Cmem.

Hence, Qresidu may be re-written in order not to depend on Cmem.

$$Q_{résidu} = \left(\frac{C_{int}}{rapport} + C_{int}\right) * V_f - \frac{C_{int}}{rapport} * V_{resetMem} - C_{int} * V_{resetInt}$$

$$Q_{résidu} = C_{int} * \left(\left(\frac{1}{rapport} + 1\right) * V_f - \frac{1}{rapport} * V_{resetMem} - V_{resetInt}\right)$$

Hence, in the total charge, comprising that of Qcompteur and of Qresidu, only Cint remains which is not assessed for each pixel. If there are variations on Cint between the pixels, this will create a gain error between the pixels on the total charge. Such a gain variation can be measured and corrected by carrying out measurements while subjecting the photodetector to at least two different luminous fluxes.

Figure 12A:
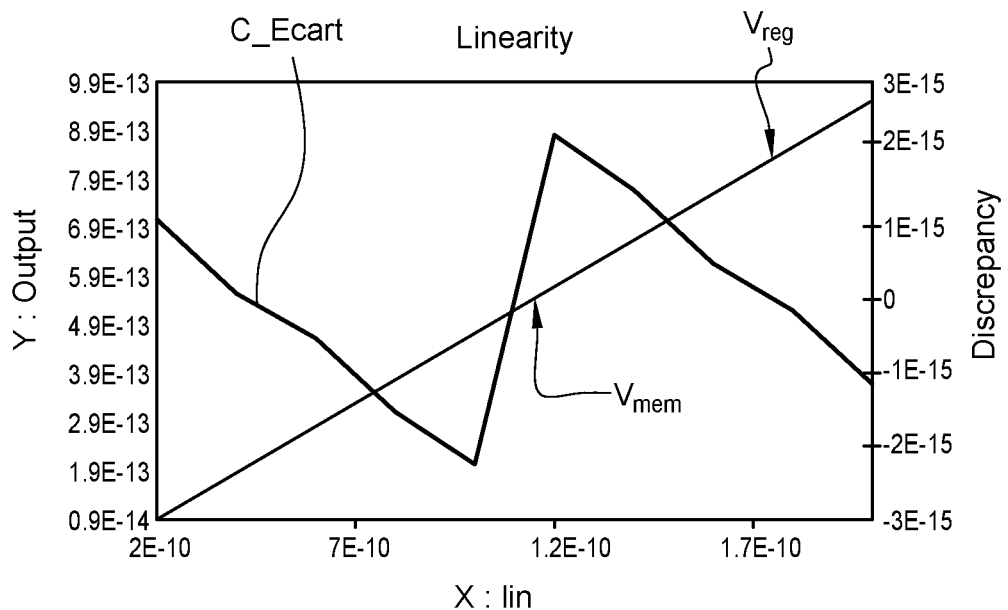
FIG. 12A-12B give linearity simulation results of one pixel for arbitrary values of the integration and memorisation capacitance and for values obtained by means of a calibration method as implemented according to the invention.

In order to demonstrate the interest of a measurement of the ratio R=Cint/Cmem, a simulation of the linearity of a pixel has been implemented and is illustrated in FIG. 12A.

In this figure, Vmem is a signal measured at the output of the pixel as a function of the flux. Vreg is a line obtained from a linear regression. The error between the two is small which implies that they are superimposed. C_Ecart represents the discrepancy between these two values and therefore the non-linearity.

To calculate the integrated total charge corresponding to each flux, values of the implanted integration capacitances and memorisation capacitance are set.

Notice that the ratio R is different from that one that is found if a ratio of the values of implanted capacitances is considered.

Figure 12B:
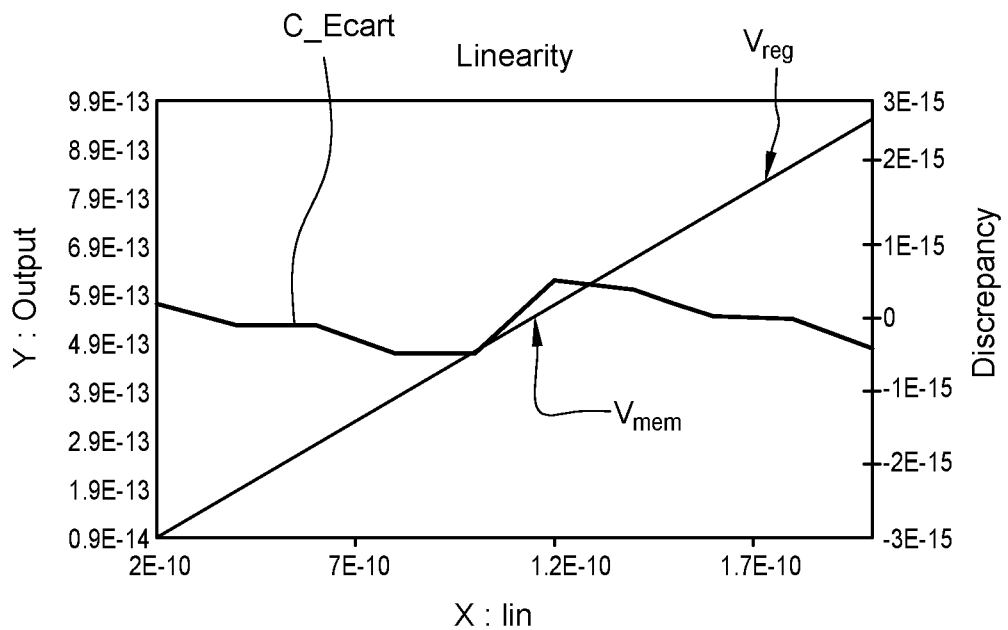

When the capacitance values obtained using a measurement cycle as described before are used, a new non-linearity curve as illustrated in FIG. 12B is obtained.

An ideal ratio for R taking into account only the values of the capacitances is 6 in this example, whereas the calibration results allow calculating an actual R of 5.706.

Figure 5:
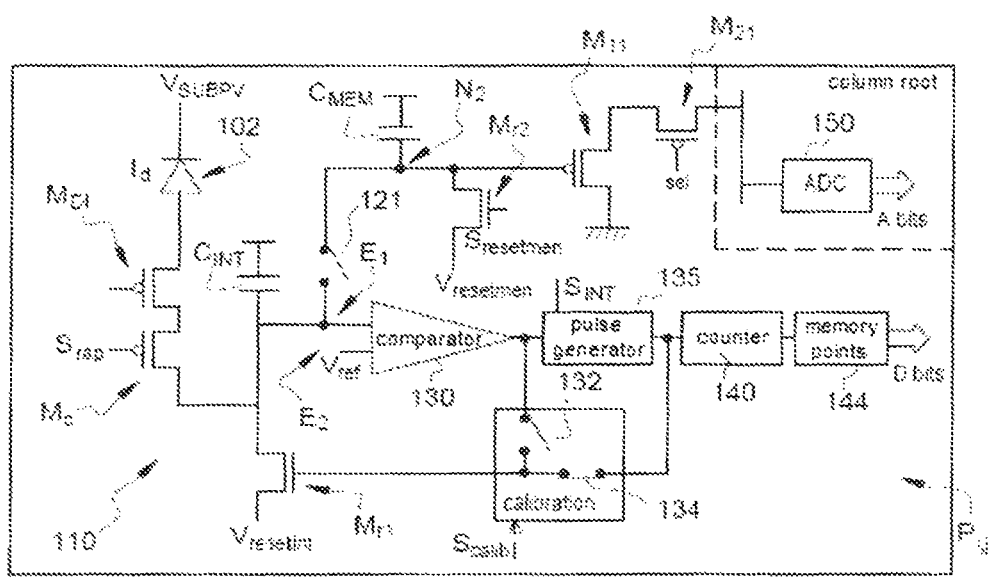
FIG. 5 is intended to illustrate a variant of a reading circuit provided with a direct-injection transistor for biasing the photodetector and with a coupling transistor arranged between the photodetector and the integration capacitance and allowing isolating the photodetector from the rest of the reading circuit.
Figure 6:
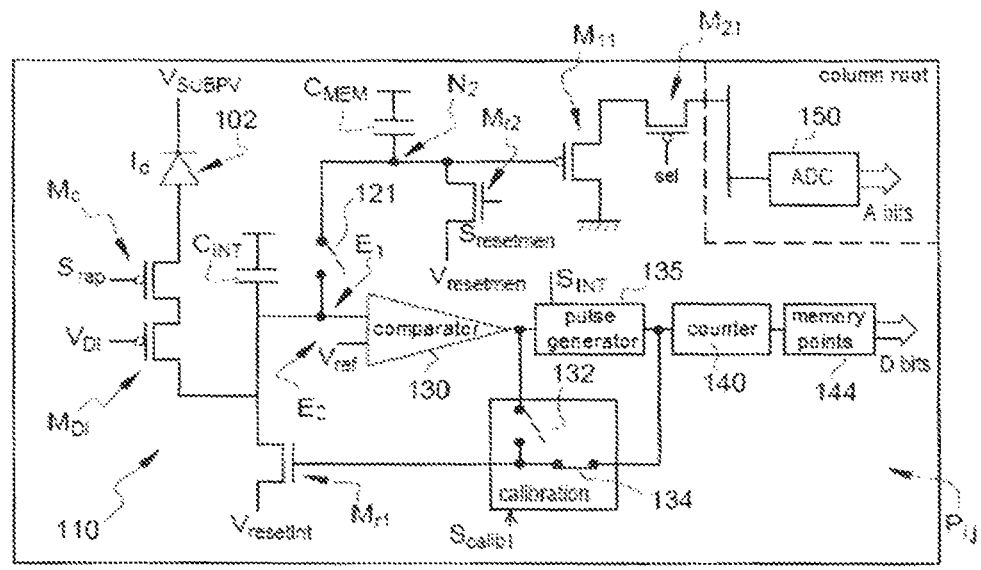
FIG. 6 is intended to illustrate a variant for which the order of distribution of the direct-injection transistor and of the coupling transistor between the photodetector and the integration capacitance is the reverse of that of FIG. 6.

In a variant illustrated in FIG. 5 of the pixel Pi,j, the current emitted by the photodiode 102 crosses a so-called direct-injection (DI standing for "Direct Injection") structure which is used to properly bias the photodiode 102. The biasing structure is herein in the form of a direct-injection transistor $M_{DI}$ and allows maintaining a fixed polarisation on the photodiode 102 during the current integration by the integration capacitance $C_{INT}$ and isolating the photodiode 102 from the variations of the voltage at the terminals of the integration capacitance $C_{INT}$. The direct-injection transistor $M_{DI}$ is arranged between an electrode of the photodiode 102 and an electrode of the coupling transistor Mc. In turn, the coupling transistor is arranged between an electrode of the transistor $M_{DI}$ and the integration capacitance $C_{INT}$.

Figure 7:
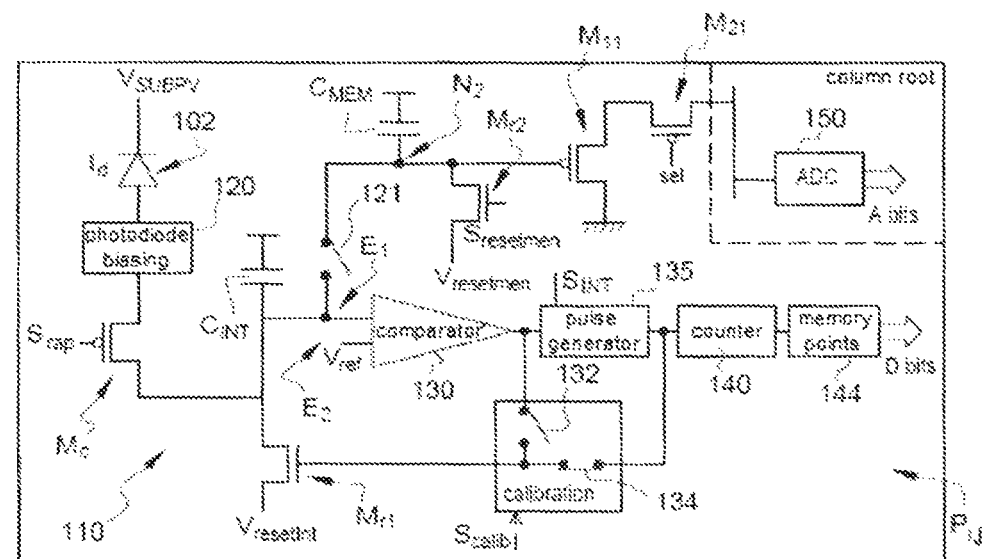
FIG. 7 is intended to illustrate a variant of a reading circuit with a biasing stage different from biasing by direct injection and set in series with a coupling transistor arranged between the photodetector and the integration capacitance.

A reverse distribution between the direct-injection transistor $M_{DI}$ and the coupling transistor Mc may be provided for. Thus, in the embodiment illustrated in FIG. 7, the coupling transistor Mc is arranged between an electrode of the photodiode 102 and an electrode of the direct-injection transistor $M_{DI}$. In turn, the direct-injection transistor $M_{DI}$ is arranged between an electrode of the coupling transistor Mc and the integration capacitance $C_{INT}$.

A biasing structure distinct from a direct-injection (DI) mounting may also be provided for. Thus, in the embodiment illustrated in FIG. 7, a biasing block 120 of the photodiode 120 is arranged between the photodiode 102 and the coupling transistor Mc. According to a particular embodiment, this biasing block 120 can for example follow a BDI-type (standing for "Buffered Direct Injection") mounting. In this mounting type, an amplifier, in particular a gain differential amplifier A is provided for and typically includes an input set at a fixed voltage and another input coupled to a drain or source electrode of a direct-injection transistor, the other source or drain electrode of this DI transistor being connected to the photodiode. An output of the amplifier A governs the gate voltage of the direct-injection transistor. Hence, there is feedback established on a signal used to bias the photodiode 102. Such a biasing architecture addresses a need for reducing the input impedance of the reading circuit 110, while limiting the number of additional transistors that are necessary.

Figure 8:
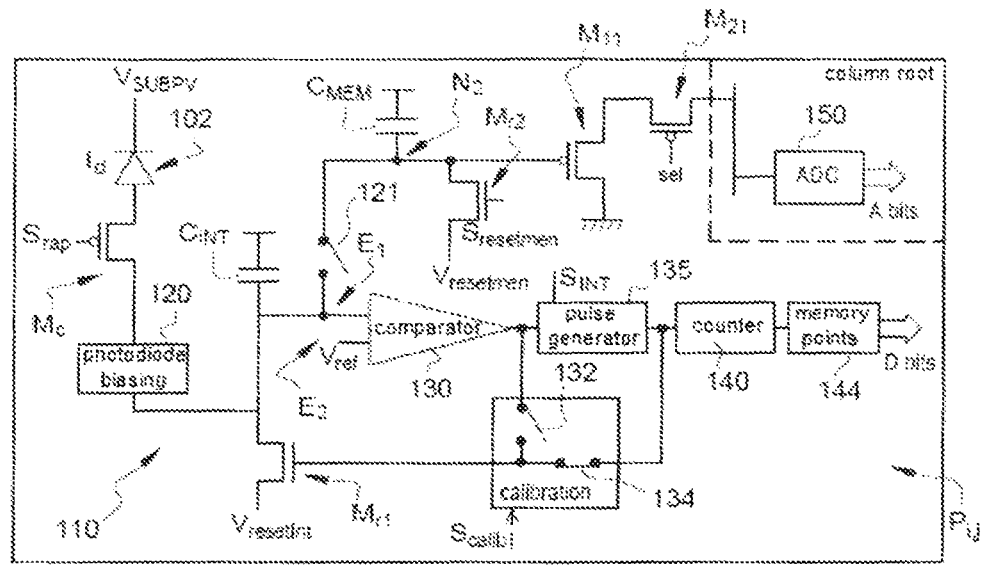
FIG. 8 is intended to illustrate a variant for which the order of distribution of the biasing stage and of the coupling transistor is the reverse of that of FIG. 7.

Herein again, a reverse distribution between the biasing block 120 and the coupling transistor Mc may be provided for. Thus, in the embodiment illustrated in FIG. 8, the coupling transistor Mc is arranged between an electrode of the photodiode 102 and the biasing block 120. In turn, the biasing block 120 is arranged between an electrode of the coupling transistor Mc and the integration capacitance $C_{INT}$.

Figure 9:
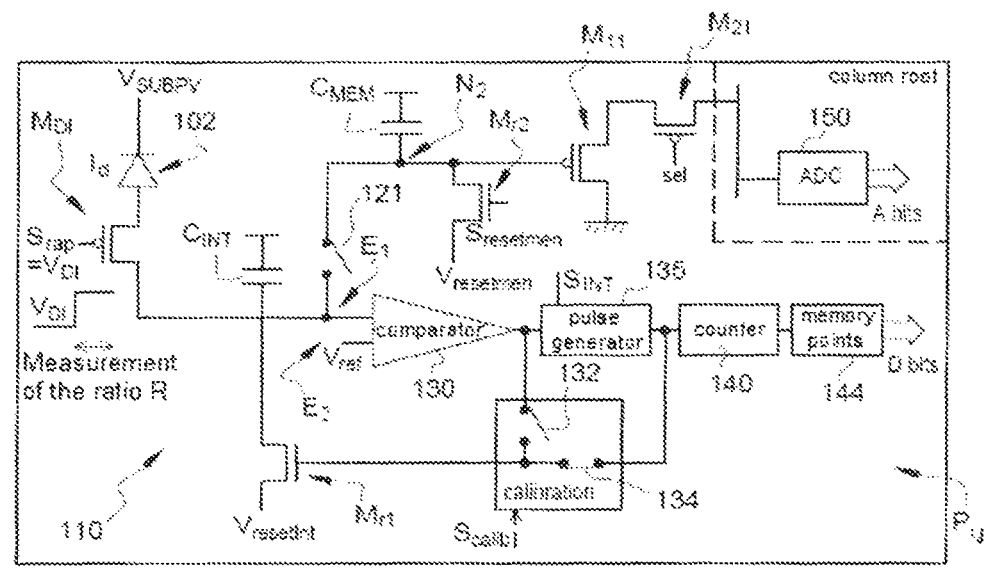
FIG. 9 is intended to illustrate a variant of a reading circuit with a direct-injection transistor which serves as a coupling transistor arranged between the photodetector and the integration capacitance.

In another variant illustrated in FIG. 9, the direct-injection transistor $M_{DI}$ which is used to bias the photodiode 102 also serves as a coupling transistor to alternately couple the photodiode 102 to the capacitance in the rest of the reading circuit 110 and in particular to the integration capacitance $C_{INT}$, and to decouple (i.e. isolate) the photodiode 102 off the rest of the reading circuit 110 and in particular off the integration capacitance $C_{INT}$. Thus, as indicated before, during a phase of assessing the ratio R of a measurement cycle where the photodiode 102 is first coupled to the reading circuit 110, a modification of the signal Srap applied on the gate of the coupling transistor herein corresponding to the direct-injection transistor $M_{DI}$ allows cutting off the current from the photodiode 102 towards the reading circuit 110. During the measurement cycle, when it is desired to measure the capacitance ratio R, this gate voltage is modified so that it positions the transistor in open circuit rather than in cascade.

Figure 10:
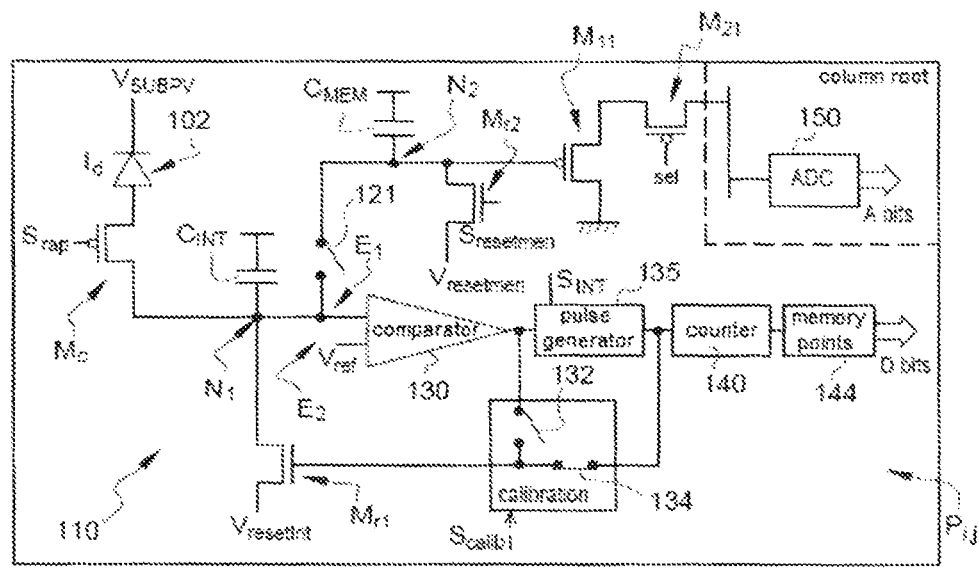
FIG. 10 is intended to illustrate a variant of a reading circuit with a coupling transistor but which has no stage for biasing the photodetector.

An embodiment without a biasing stage where, like in FIG. 10, the coupling transistor Mc is connected to an electrode of the photodiode 102 and directly to the first node $N_1$ is also possible.

Alternatively to either one of the previously-described embodiments, it is possible to provide for a P-on-N type photodiode instead of a N-on-P type diode 102.

In this case, the reset transistors Mr1, Mr2, may consist of PMOS-type transistors. For such a variant, the coupling transistor Mc and the direct-injection transistor $M_{DI}$ may, this time, consist of NMOS-type transistors. The follower transistor $M_{11}$ and the line selection transistor $M_{12}$ may also be of the NMOS-type.

Figure 11:
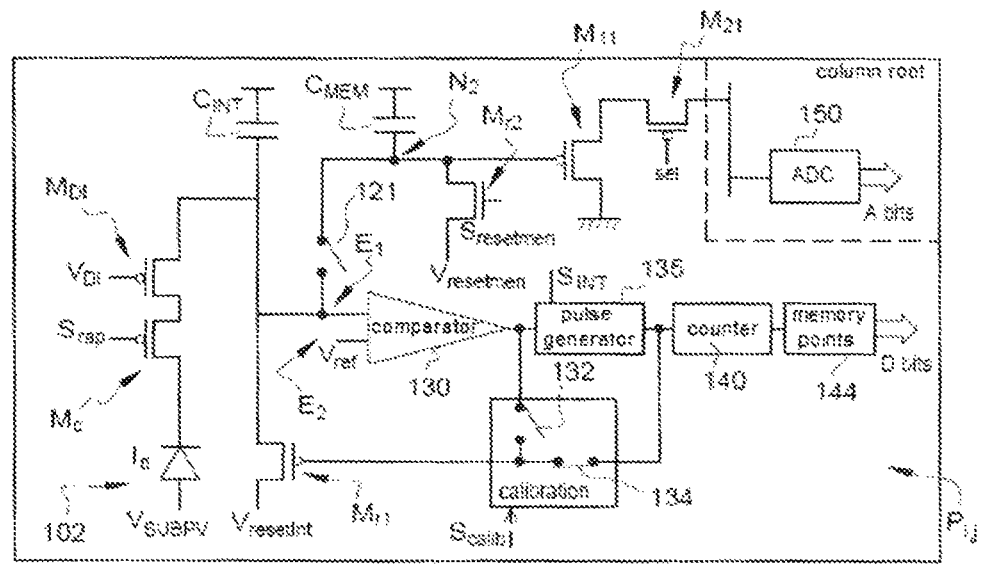
FIG. 11 is intended to illustrate a variant of the arrangement of the reading circuit suited for a connection of the latter on an area P of a P-on-N type photodiode.
Figure 13A:
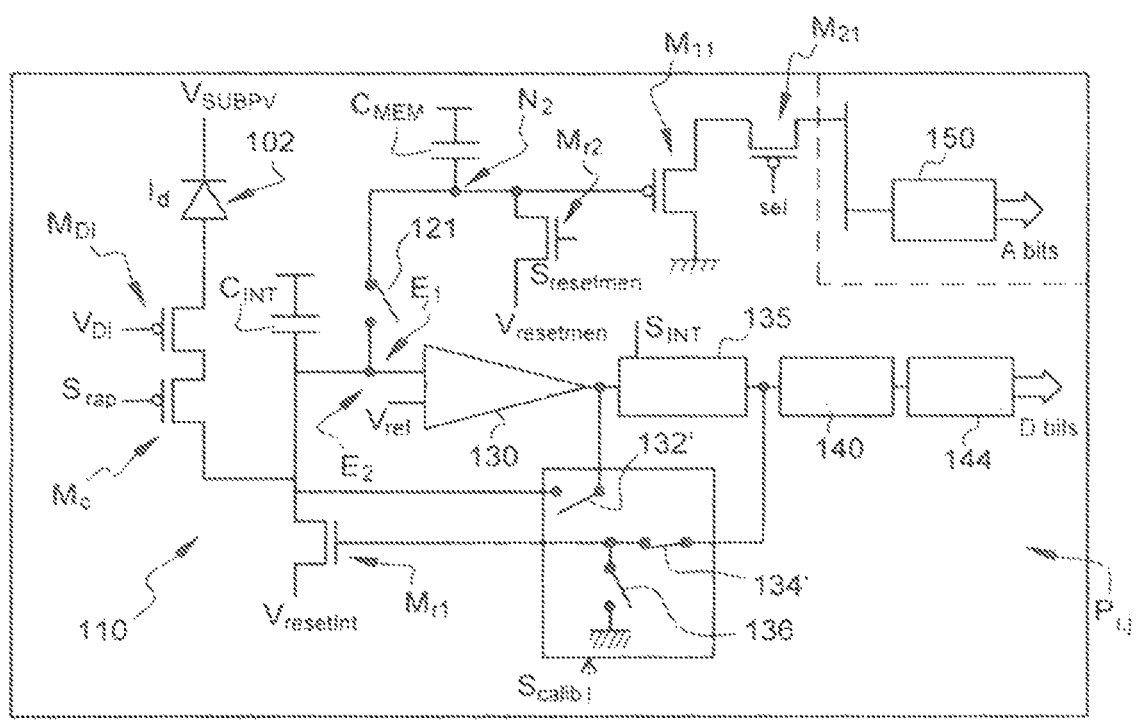
FIGS. 13A-13B are intended to illustrate a variant of the arrangement of the reading circuit.
Figure 13B:
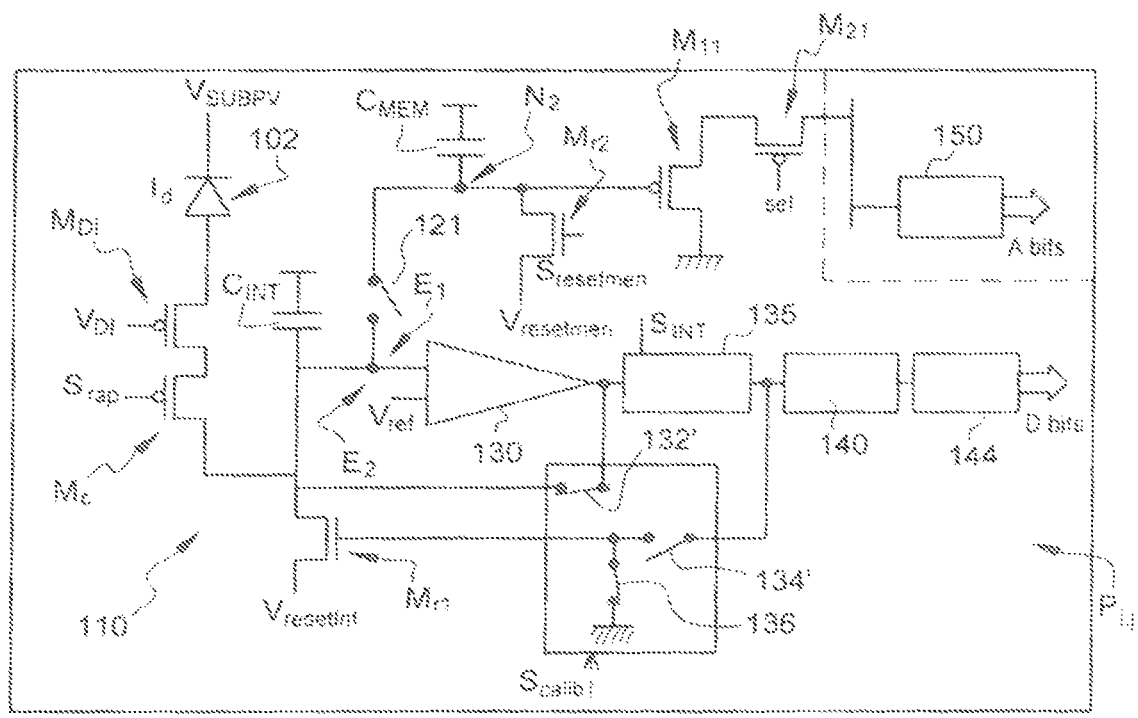

An embodiment of such a variant is illustrate for example in FIG. 11, where the N-on-P type photodiode 102 includes an anode set at a fixed potential VSUPV and a cathode connected to the coupling transistor Mc. An alternative embodiment of a readout circuit as described above is given in FIGS. 13A-13B. For this variant, in the normal operating mode (FIG. 13A), a switch 134' called second switch arranged between the output of the pulse generator block 135 and the first reset transistor Mr1 is closed (i.e. on) and reset pulses are emitted on the gate of the reset transistor Mr1 In another operating mode (FIG. 13B) in which one or more measurements are carried out in order to perform a calibration, a switch 132' called the first switch and located between the output and the input E1 of the comparator 130 is closed in order to connect this output of the comparator 130 to this input E1. The comparator 130 is then mounted as a follower during the evaluation of the reference voltage Vref on the second input E2. The switch 134' is then open (i.e. not conducting) and an additional switch 136, located between this second switch 134' and the reset transistor Mr1, is closed (made conducting). This additional switch 136, arranged between the gate of the transistor Mr1 and a given potential, in this example a reference potential corresponding to earth, makes it possible to ensure that the reset transistor Mr1 is indeed blocked or opened so that it does not intervene in this mode of reading the voltage Vref. Such a variant of realization of the measurement of the voltage Vref can be used independently of other calibration and measurement means previously described. In particular, such a variant realization of the measurement of Vref can be used for other readout circuits of a photodiode, for example in the case where a single integration capacitor is present.

The invention claimed is:

1. An imaging device including a plurality of pixels, each pixel being formed by a photodetector associated and connected to a reading circuit, comprising:
    an integration capacitance for storing charges originating from the photodetector and connected to a first node,
    a first reset transistor configured, when it is made conducting, to reset the integration capacitance,
    at least a coupling transistor, arranged between the photodetector and the integration capacitance for alternately, coupling the photodetector to the first node when it is made conducting, and decoupling the photodetector off the first node when it is made non-conducting,
    a memorisation capacitance connected to a second node,
    a second reset transistor configured, when it is made conducting, to reset the memorisation capacitance,
    a memorisation switch between the integration capacitance and the memorisation capacitance, when it is made conducting, to connect the integration capacitance and the memorisation capacitance, and when it is made non-conducting, to disconnect the integration capacitance from the memorisation capacitance, the device further comprising: a circuit for controlling the reading circuit configured, during a measurement cycle including a phase of estimating a ratio R=Cint/Cmem between an estimated value of the integration capacitance and an estimated value Cmem of the memorisation capacitance:
    according to a first part of said phase of estimating said ratio R to make the first reset transistor and the second reset transistor conducting so as to respectively reset the integration capacitance and the memorisation capacitance and to make said memorisation switch non-conducting so as to disconnect the integration capacitance from the memorisation capacitance and during the first phase and during the first part, to decouple the photodetector off said first node, then,
    according to a second part of said estimation phase to make the first reset transistor and the second reset transistor non-conducting and to make said memorisation switch conducting so as to connect the first node and the second node, and thus be able to assess a potential at said second node representative of said ratio R=Cint/Cmem.

2. The imaging device according to claim 1, wherein the reading circuit further includes:
    a comparator connected to the integration capacitance, a first input of the comparator being coupled to the first node, a second input of the comparator being set at a reference voltage,
    a pulse generator block at the output of the comparator and configured, in a normal operation mode, when it is coupled to the first reset transistor and when the first input reaches the reference voltage, to consecutively emit a pulse for triggering a reset of the integration capacitance via the first reset transistor.

3. The imaging device according to claim 2, wherein the control circuit is configured to produce an operating mode control signal, during said phase of estimating said ratio, during said first part: to set said operating mode control signal in a first state so as to set the pulse generator block in a first operating mode in which the pulse generator block holds at the output, irrespective of the first input, a signal for triggering a reset of the integration capacitance, then during the second part: to set said control signal in a second state so as to set the pulse generator block in a second mode corresponding to said normal operation mode.

4. The imaging device according to claim 2, wherein the reading circuit further includes:
a pulse counter at the output of the pulse generator,
a element for memorising counting digital data derived from said pulse counter.

5. The device according to claim 2, further comprising a switching circuit provided with at least one first switch arranged between the output of the comparator and the first reset transistor and a second switch arranged between the output of the pulse generator, the first reset transistor and the second switch being controlled by the control circuit, the first switch and the second switch being intended to respectively, directly connect the output of the comparator to the reset transistor during at least one phase of the measurement cycle for assessing the reference voltage, and to connect the output of the pulse generator to the first reset transistor during at least one other phase of the measurement cycle or of a so-called "normal operation" cycle, the control circuit of the reading circuit being further configured, during the phase of assessing the reference voltage, to:
make the first switch conducting while making the second switch non-conducting, while connecting the first node to the second node, so as to be able to assess a value of the reference voltage according to a potential at said second node.

6. The imaging device according to claim 1, wherein the second reset transistor is adapted to reset the memorisation capacitance at a second reset voltage and wherein the control circuit is configured, during a phase of assessing the second reset voltage of said measurement cycle to: reset the memorisation capacitance while making said memorisation switch non-conducting so as to disconnect the integration capacitance of the memorisation capacitance, and thus allow assessing a potential at said second node resulting from this reset and representative of the second reset voltage.

7. The imaging device according to claim 1, wherein said first reset transistor is able to reset said integration capacitance at a first reset voltage and wherein said control circuit is configured, during a phase of assessing said first reset voltage of said measurement cycle, to trigger a reset of the integration capacitance while making said memorisation switch conducting so as to connect the integration capacitance to the memorisation capacitance, and thus allow assessing a potential at said second node resulting from this reset and representative of the first reset voltage.

8. The imaging device according to claim 1, wherein the coupling transistor is arranged in series with a biasing stage of the photodetector, in particular a direct-injection or buffered direct-injection biasing stage.

9. The imaging device according to claim 1, wherein the coupling transistor includes an electrode amongst its source or drain electrodes connected to an electrode of the photodetector and another electrode amongst its drain or source electrodes connected to the integration capacitance, the control circuit of the reading circuit being configured, during the first step of said phase of assessing said ratio R, to apply to the gate of the coupling transistor, a signal for triggering decoupling of the photodetector off said first node.

10. The imaging device according to claim 9, wherein the coupling transistor is a direct-injection biasing transistor of the photodetector.

11. The imaging device according to claim 1, the reading circuit being further provided with a follower transistor coupled to the second node and with a line selection transistor.

12. The imaging device according to claim 1, wherein the first reset transistor includes an electrode set at a first reset voltage and wherein the second reset transistor includes an electrode set at a second reset voltage distinct from the first reset voltage.

* * * * *